(12) United States Patent
Burghardt et al.

(10) Patent No.: US 8,293,322 B2
(45) Date of Patent: Oct. 23, 2012

(54) SURFACES CONTAINING COUPLING ACTIVATOR COMPOUNDS AND REINFORCED RESINS PRODUCED THEREFROM

(75) Inventors: Thomas Burghardt, Parker, CO (US); Jawed Asrar, Greenwood Village, CO (US); Klaus Friedrich Gleich, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 13/083,331

(22) Filed: Apr. 8, 2011

(65) Prior Publication Data

US 2011/0180957 A1    Jul. 28, 2011

Related U.S. Application Data

(62) Division of application No. 12/008,041, filed on Jan. 8, 2008, now abandoned.

(51) Int. Cl.
   *B05D 7/00* (2006.01)
(52) U.S. Cl. ............... 427/214; 427/215; 427/427.4; 528/26; 528/310; 528/314; 528/315
(58) Field of Classification Search ............. 427/214, 427/215, 427.4; 528/26, 310, 314, 315, 323
   See application file for complete search history.

(56) References Cited

U.S. PATENT DOCUMENTS

| | | | |
|---|---|---|---|
| 3,621,001 A | 11/1971 | Steinhofer et al. | |
| 4,105,644 A | 8/1978 | Bukac et al. | |
| 4,188,478 A | 2/1980 | Goebel, Jr. | |
| 4,697,009 A | 9/1987 | Deschler et al. | |
| 5,096,644 A * | 3/1992 | Endo et al. | 264/137 |
| 5,132,342 A * | 7/1992 | Chillous | 523/513 |
| 5,240,974 A * | 8/1993 | Lechner et al. | 523/214 |
| 5,782,908 A | 7/1998 | Calahan et al. | |
| 5,864,007 A | 1/1999 | Schmid et al. | |
| 6,013,855 A | 1/2000 | McPherson et al. | |
| 6,358,557 B1 | 3/2002 | Wang et al. | |
| 6,579,965 B2 | 6/2003 | Hoogen et al. | |
| 2003/0096904 A1 | 5/2003 | Hakuta et al. | |
| 2007/0072199 A1 | 3/2007 | Levicky et al. | |

FOREIGN PATENT DOCUMENTS

| | | |
|---|---|---|
| JP | 08-291186 | 11/1996 |
| WO | 2003084583 | 10/2003 |

OTHER PUBLICATIONS

Feng et al An Efficient Approach to Surface-Initiated Ring-Opening Metathesis Polymerization of Cyclooctadiene, Langmuir, 2007, 23 (3), pp. 1004-1006, Publication Date (Web): Dec. 22, 2006.*

* cited by examiner

*Primary Examiner* — Gregory Listvoyb
(74) *Attorney, Agent, or Firm* — Robert D. Touslee

(57) ABSTRACT

The invention relates to products and processes employing coupling activator compounds represented by the following formula I:

$$S\text{—}X\text{-}A \qquad (I)$$

wherein S represents a silane coupling moiety capable of bonding with the surface of an inorganic substrate, A represents a ring-opening polymerization activator moiety, or blocked precursor thereof, and X represents a linking moiety. Substrates containing the coupling activator compounds are useful in preparing reinforced resins.

10 Claims, No Drawings

SURFACES CONTAINING COUPLING ACTIVATOR COMPOUNDS AND REINFORCED RESINS PRODUCED THEREFROM

BACKGROUND OF THE INVENTION

This application is a division of application Ser. No. 12/008,041, filed Jan. 8, 2008. It is well-known to employ inorganic materials in composite articles to strengthen and reinforce the articles. In addition to Increased dimensional stability, addition of the inorganic material provides polymer composites with significantly improved physical and mechanical properties. As one example, glass fibres may be placed into a polymer matrix where the high tensile strength of glass causes the composite to become more rigid. The glass fibres incorporated in the polymer matrix may take various forms: continuous or chopped strands, rovings, woven or non-woven fabrics, continuous or chopped strand mats, etc.

Conventionally, glass fibres are formed by attenuating streams of a molten glass material from a bushing or orifice. The glass fibres may be attenuated by pulling by a winder, which collects filaments into a package or by other equipment or method capable of pulling the fibres. A sizing composition, or chemical treatment, is typically applied to the fibres after they are drawn from the bushing. After the fibres are treated with the sizing, which is typically in aqueous form, they may be dried in a package, chopped, or kept in the wet state before downstream processing.

Fibreglass may be mixed with a polymeric resin in an extruder and supplied to a compression- or injection-moulding machine to be formed into glass fibre-reinforced plastic composites. Typically, polymer pellets and fibreglass are fed together or separately into an extruder. During the extrusion process using single or twin-screw machines, the resin is melted and the fibres are dispersed throughout the molten resin to form a fibre/resin mixture. Next, the fibre/resin mixture may be degassed, cooled, and formed into pellets. The dry fibre strand/resin dispersion pellets are then fed to a moulding machine and formed into moulded composite articles that have a substantially homogeneous dispersion of glass fibre strands throughout the composite article.

Alternatively, in the process using continuous filaments, fibreglass filaments are mixed with the molten resin in an extruder with the screw geometry designed to mix the matrix with fibres without causing significant damage to the fibres. Obtained extruded materials are then subjected to compression moulding to form long-fibre reinforced thermoplastic materials with significantly improved mechanical properties due principally to the fibres having a higher aspect ratio.

Various chemical treatments exist for inorganic surfaces such as glass fibres to aid in their processability and applications. After fibre formation and before bundling, the filaments or fibres may be treated with a coating composition (hereinafter referred to as a "sizing composition") that is applied to at least a portion of the surface of the individual filaments to protect them from abrasion, improve the chemical or physical bonding, and to assist in processing. As used herein, the term "sizing composition", refers to any such coating composition applied to the filaments after forming. Sizing compositions may provide protection for subsequent processing steps, such as those where the fibres pass by contact points as in the winding of the fibres and strands onto a forming package, drying the sized fibres to remove the water and/or other solvent or melting of the film former on the fibre surface, twisting from one package to a bobbin, beaming to place the yarn onto very large packages ordinarily used as the warp in a fabric, chopping in a wet or dry condition, roving into larger bundles or groups of strands, unwinding, and other downstream processes. In addition, sizing compositions can play a dual role when placed on fibres that reinforce polymeric matrices in the production of fibre-reinforced plastics. In such applications, the sizing composition can provide protection as well as compatibility and/or chemical bonding between the fibre and the matrix polymer. Conventional sizing compositions typically contain one or more film forming polymeric or resinous components, glass-resin coupling agents, and one or more lubricants dissolved or dispersed in a liquid medium. The film forming component of the sizing composition is desirably selected to be compatible with the matrix resin or resins in which the glass fibres are to be embedded.

Many types of polymers may be reinforced by inorganic materials. Of particular note are those polymers formed by ring-opening polymerization reactions. Polyamides (PA), such as poly(caprolactam), commonly know as "Nylon-6" or "polyamide-6", are examples of resins formed by ring-opening polymerization that are frequently reinforced by glass fibres. There is a need to provide glass-reinforced polyamide composites with high glass loading; however, one of the barriers is the high polymer viscosity of the polyamide in the molten state. This high viscosity hinders the dispersion of the glass fibres throughout the molten resin when the fibre/resin mixture is formed.

Anionic-catalysed ring-opening polymerization of lactams has become a commercially significant method for preparation of PA resins since these polymerizations can be conducted at relatively low temperatures and under atmospheric pressures. Caprolactam is by far the most studied lactam for such reactions and Nylon-6 prepared by this route compares favorably in properties with that prepared by conventional hydrolytic polymerization. Fast reaction kinetics, absence of by-products, and the crystalline nature of the Nylon so produced also makes anionic polymerization of lactams a compelling choice for several industrial applications, including reactive extrusion, reactive thermoplastic pultrusion, reaction transfer molding, D-LFT, compression and injection molding, and reaction injection molding.

In its various embodiments, the present invention combines the processes of forming and loading the inorganic component of a reinforced resin with the ring-opening polymerization of a suitable monomer. The invention thereby overcomes any high viscosity issue associated with combining fibres with resins, provides improved interfacial adhesion between the polymer matrix and the inorganic reinforcing material, and thereby provides improved composite materials.

BRIEF SUMMARY OF THE INVENTION

In one embodiment, the invention provides an inorganic substrate, for example glass fibres in the form of continuous strands, chopped strands, rovings, mats, etc., having bonded thereto a "coupling activator" compound of the following formula I:

$$S\text{—}X\text{-}A \tag{I}$$

wherein S represents a silane coupling moiety through which the compound is bonded to the inorganic substrate, A represents a ring-opening polymerization activator moiety, or a blocked precursor thereof, and X represents a linking moiety capable of linking the S moiety and the A moiety. The polymerization activator moiety or precursor is capable of participating in an in situ ring-opening polymerization of a monomer in the presence of a polymerization catalyst when exposed to ring-opening polymerization conditions. As a result, the inorganic substrate of the invention may be used as a ring-opening polymerization activator, alone or with conventional polymerization activators, in the formation of polymers that are reinforced with the inorganic material. As examples of inorganic substrates, mention may be made of glass, basalt, carbon fibres, carbon nanotubes, inorganic nanotubes, and metal fibres. For the purposes of the present invention, carbon nanotubes and carbon fibres are inorganic substrates. Glass substrates of the invention are particularly useful in the formation of glass-reinforced polyamides.

The surface of the substrate of the invention may contain a coating of a sizing composition comprising a coupling activator compound of formula I above. In one embodiment of the invention, silane-functionalized isocyanate may be blocked with caprolactam to produce 2-oxo-N-(3-(triethoxysilyl)propyl)azepane-1-carboxamide, which can participate in the anionic ring-opening polymerization of caprolactam monomer.

Blocked precursors of coupling activator compounds may include isocyanates blocked with compounds other than the activator compound. Under the processing conditions, such blocked isocyanate would become unblocked to furnish free isocyanate.

The isocyanate may, under the reaction conditions, become blocked with the monomer thus forming the polymerisation activator. The silane functionality of the isocyanate compound may react with the substrate, such as glass, thus leading to improved interfacial adhesion.

In another embodiment, the invention provides a process for preparing a reinforced resin material, e.g. a glass-reinforced resin polyamide. A sizing composition comprising a coupling activator compound of formula I above may be applied to a glass substrate. In one embodiment, the sized glass substrate may be mixed with a lactam monomer, e.g. caprolactam, and a polymerization catalyst to form a polymerization mixture that may then be exposed to conditions sufficient to cause an in situ anionic ring-opening polymerization of the lactam monomer. In another embodiment, the sized glass substrate may be mixed with a cyclic olefin monomer, e.g. norbornene, and a polymerization catalyst to form a polymerization mixture that may then be exposed to conditions sufficient to cause an in situ ring-opening metathesis polymerization of the cyclic olefin monomer. The resulting composite products comprise a matrix in which the glass substrate is grafted onto the polymer, thereby substantially improving the coupling between the glass and the polymer. This improved coupling is expected to provide tougher composite materials.

In other embodiments, the invention provides processes for forming a reinforced resin material into a solid mass of a prescribed shape and size by conventional processing procedures, e.g. reactive extrusion, resin transfer molding, pultrusion, reaction injection molding, or any other suitable process.

These and other embodiments of the present invention are described in greater detail in the detailed description of the invention which follows.

DETAILED DESCRIPTION OF THE INVENTION

The invention relates to products and processes employing certain compounds referred to herein as "coupling activator" compounds because they serve both a coupling and a ring-opening polymerization function. In general terms, coupling activator compounds of the invention may be represented by the following formula I:

wherein S represents a silane coupling moiety capable of bonding to the surface of an inorganic substrate, A represents a ring-opening polymerization activator moiety or a blocked precursor thereof, and X represents a linking moiety capable of linking the S moiety and the A moiety. As examples of suitable X moieties, mention may be made of alkyl, aryl, and alkyl-aryl groups. The linking group X may be of any length, including null, in which case the activator moiety A would be directly attached to the silane S.

The silane coupling moiety S may comprise any of the known functional groups that react with the surface of an inorganic substrate, e.g. an organosilane group. Compounds containing organosilane groups are well known coupling agents in material systems that consist of an inorganic (e.g. glass) and organic (e.g. polymer) phase, and serve to covalently bond the organic groups in the compound to groups on the inorganic surface. As one example, S may comprise an organosilane group of the following formula II:

wherein X is as defined in Formula I above; and $R^1$, $R^2$ and $R^3$ may be the same or different and each may represent alkyl, aryl, alkoxy, halogen, hydroxy, or a cyclic structure wherein X is connected with one or more of $R^1$, $R^2$ and $R^3$.

The ring-opening polymerization activator moiety A may be any known organic reactive group that participates in a ring-opening polymerization reaction, which term includes anionic ring-opening polymerization, cationic ring-opening polymerization and ring-opening metathesis polymerization (ROMP). For example, such reactive group may participate in the polymerization by forming a reactive center where further cyclic monomers can join after opening to provide a larger polymer chain through ionic propagation.

In one embodiment, the A moiety may be a group that serves the function of an activator in the anionic ring-opening polymerization of a lactam or a lactone, e.g. A may be an N-substituted imide group. Such polymerizations are well-known in the art and will not be discussed herein in great detail. If further reference is needed, these polymerization reactions are discussed more completely in the patent literature, e.g. in U.S. Pat. Nos. 3,621,001; 4,188,478; 5,864,007; 6,579,965; and the patents cited therein, all of which are incorporated by reference herein. Generally, these polymerizations are conducted at low temperatures (80-160° C.), below the melting point of the resulting polyamides (which is typically above 200° C.), and typically employ, in addition to the activator compound, two other components; i.e.: a lactam monomer and a polymerization catalyst. The monomer component may be a lactam or lactone having from 3 to 12 carbon atoms in the main ring, such as caprolactam and caprolactone. The polymerization catalyst may be an alkali metal salt of the lactam or lactone monomer, such as sodium caprolactam and sodium caprolactone. There may also be other known auxiliary components in the polymerization mixture (e.g. co-initiators, catalysts, co-catalysts, electron donors, accelerators, sensitizers, processing aids, release agents, etc.).

In the anionic ring-opening polymerization of the lactam or lactone monomer, the combination of monomer and polymerization catalyst produces a catalyzed monomer species containing an atom with a reactive free anion. As used herein, the term "ring-opening polymerization activator" may be used to denote this catalyzed monomer species, and the term "ring-opening polymerization activator moiety" may be defined as a group that reacts with the catalyzed monomer molecule to cleave the lactam ring and start the initial growth of the polymeric chain. In one embodiment the polymerization catalyst may comprise an alkali metal salt of the lactam or lactone and the activator moiety may comprise an N-substituted imide group, e.g. an N-acyl lactam group.

As another example, in the ring-opening metathesis polymerization (ROMP) of a cyclic olefin monomer such a norbornene, cyclopentadiene, cyclooctadiene, decyclopentadiene, etc., the A moiety of the compound of Formula I above may be a cyclic olefin-substituted imide group that undergoes ROMP under catalytic conditions using an alkylidene catalyst such as developed by R. R. Schrock or R. Grubbs. In this case the A moiety becomes part of the polymer chain.

As specific examples of coupling activator compounds of Formula I above that are useful in the anionic ring-opening polymerization of lactams, mention may be made of certain N-propylsilyl-N'-acyl-ureas described in U.S. Pat. No. 4,697,009, incorporated by reference herein. In one embodiment, the coupling activator compound may comprise 2-oxo-N-(3-(triethoxysilyl)propyl)azepane-1-carboxamide.

In one embodiment, the coupling activator compounds of the invention may be prepared in accordance with the process set forth in the aforementioned incorporated U.S. Pat. No. 4,697,009. For example, the coupling activator compounds may be prepared by mixing in an aprotic, polar organic solvent such as N,N-dimethylformamide equimolar amounts of an alkali isocyanate (e.g. sodium isocyanate or potassium isocyanate), a 3-halopropyl silane (e.g. 3-chloropropyltriethoxysilane) and caprolactam, and reacting the ingredients with each other at elevated temperature. At the end of the reaction and cooling the mixture to room temperature, the precipitated alkali halide may be filtered off and the solvent may be removed from the filtrate to obtain the desired blocked isocyanate compound. Alternatively, coupling activator compounds may be prepared according to the procedure described in International Patent No. WO 2006/012957, incorporated herein by reference In another embodiment, the coupling activator, 2-oxo-N-(3-(triethoxysilyl)propyl)azepane-1-carboxamide may be prepared in accordance with the following reaction scheme A:

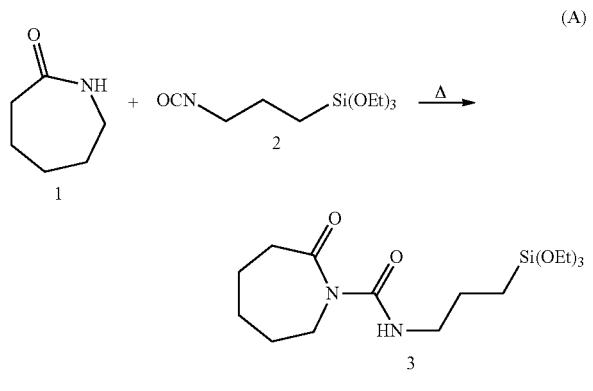

1.1 eq. of caprolactam 1 may be mixed with 1.0 eq. of 3-isocyanatopropyltriethoxysilane 2 and the mixture heated at 80-100° C. until the completion of the reaction and formation of 2-oxo-N-(3-(triethoxysilyl)propyl)azepane-1-carboxamide 3. The reaction progress can be measured by FT-IR, where disappearance of the isocyanate peak at 2300 $cm^{-1}$ should be observed. The reaction may be run neat or in solution, with 1,4-dioxane as the solvent. Organotin catalyst (e.g. dibutyltin dilaurate) may be used to significantly improve the reaction rate.

In one embodiment, a coupling activator compound of the invention may be used as the sole initiator in a anionic ring-opening polymerization reaction, or may be used in combination with other known initiator compounds. For example, compound 3 above may be used as the initiator in the reactive extrusion of Nylon-6 in accordance with the following reaction scheme B:

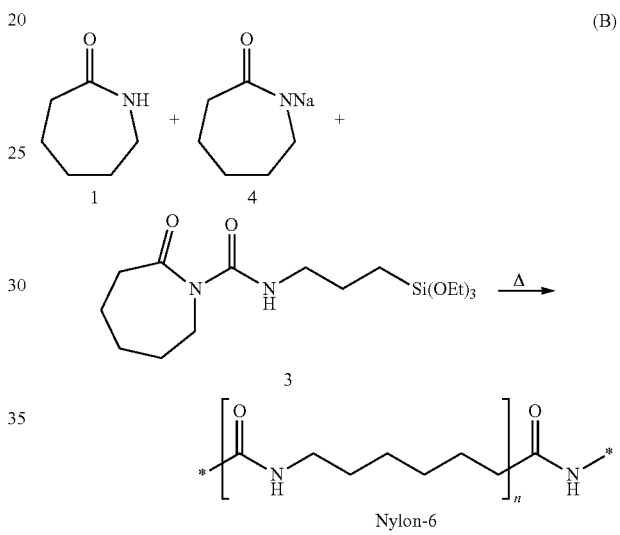

In the above reaction, 97.5 wt % of caprolactam 1 may be mixed with 1.5 wt % of the polymerization catalyst sodium caprolactam 4, and 1.0 wt % of 2-oxo-N-(3-(triethoxysilyl)propyl)azepane-1-carboxamide 3. The mixture may be fed into a zone 2 of a 15-zone, L/D=60 Leistritz co-rotating 27-mm twin-screw extruder with temperature profile of 80-205° C. at the screw speed of 78 $min^{-1}$ at torque of 4.8-9.6 MPa to accomplish ring-opening polymerization and obtain Nylon-6. Alternatively, the same results may be achieved by running the reaction in a beaker instead of using the reactive extrusion process.

In another embodiment, a coupling activator compound of the invention may participate in a ROMP reaction such as shown in the following reaction scheme C:

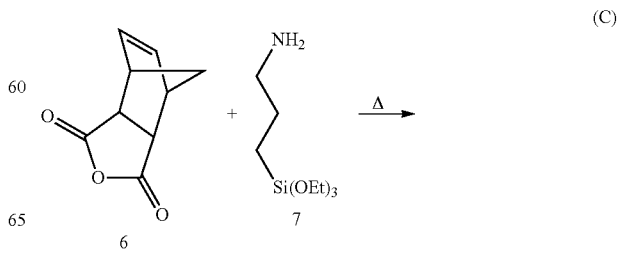

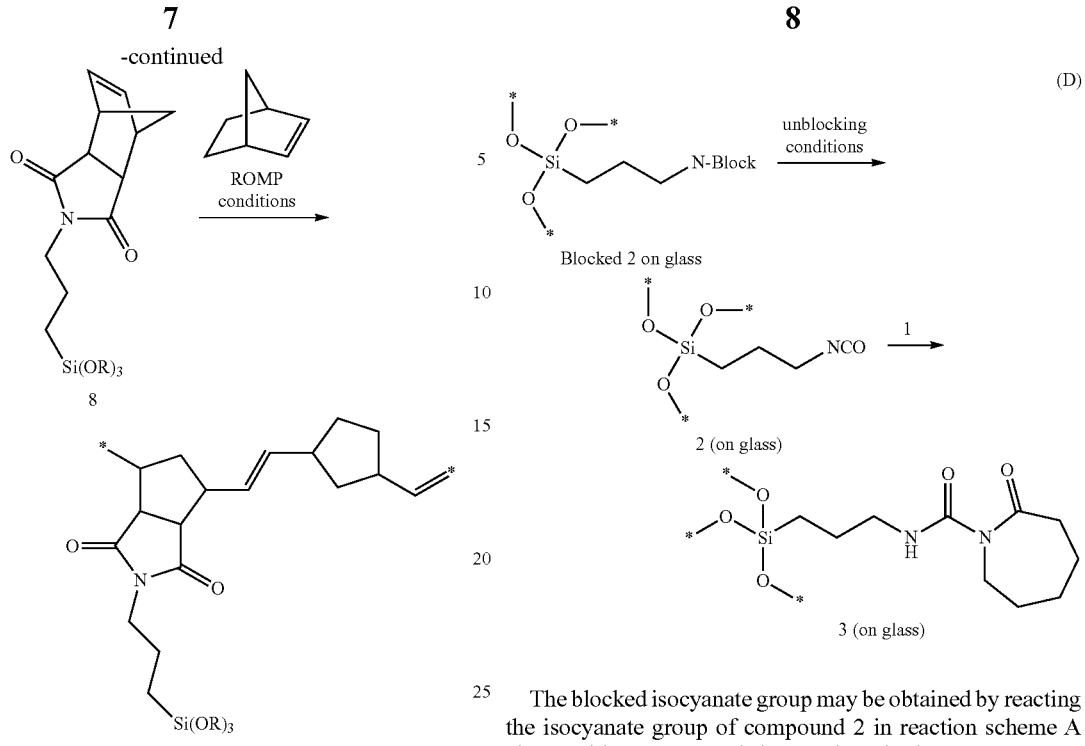

In this case, norbornene-substituted maleic anhydride 6 may be reacted with γ-aminopropyltriethoxysilane 7 to provide a substituted imide coupling activator compound 8. Coupling activator compound 8 can then undergo ring-opening metathesis polymerization (typically under catalytic conditions using rhodium, rhenium, or molybdenum alkylidene catalysts such as were developed by Grubbs or Schrock). Monomers such as cyclopentadiene, cyclooctadiene, dicyclopentadiene, norbornene or other monomers suitable for ROMP may be used to yield polymers such as illustrated by compound 9.

In another embodiment, the invention provides an inorganic substrate having bonded thereto a coupling activator compound of Formula I above. The inorganic substrate may comprise a plurality of glass fibres wherein at least one glass fibre is at least partially coated with the residue of a sizing composition comprising the coupling activator compound. As previously described, the silane coupling moiety S of the coupling activator compound that is included in the coated sizing composition may covalently bond to the glass fibre when the composition is coated and dried on the glass substrate, thereby securely attaching the coupling activator compound to the glass substrate.

Some embodiments of glass fibres according to the present invention may be particularly suited for reinforcing polyamide resins. Polyamide resins reinforced with glass fibres in accordance with the invention may comprise Nylon 6, Nylon 6:6, Nylon 6:12, Nylon 4:6, Nylon 6:10, Nylon 12, polyamide 6T (polyhexamethylene terephthalamide), polyamide 6I (polyhexamethylene isophthalamide) or mixtures thereof. In one embodiment, the A moiety of the coupling activator compound in formula I above may comprise a blocked precursor of the active activator moiety, e.g. a blocked isocyanate. In this embodiment, the precursor compound may be coated on the glass substrate and the active form of the activator may be generated in situ on the surface of a glass substrate when exposed to unblocking conditions. This process may be illustrated by the reaction scheme D below:

The blocked isocyanate group may be obtained by reacting the isocyanate group of compound 2 in reaction scheme A above with a compound that renders the isocyanate group unreactive. A suitable blocking agent for the isocyanate group may be determined by its ability to prevent the blocked isocyanate from reacting until a desired temperature is achieved. Examples of compounds that may be suitable blocking agents include, but are not limited to, oximes such as methyl ethyl ketoxime, acetone oxime, and cyclohexanone oxime, lactams such as ε-caprolactam, and pyrazoles. Organosilicon compounds with a blocked isocyanate group are known in the art, e.g. see U.S. Patent Publication 2007/0123644, incorporated herein by reference. Upon heating or other deblocking conditions, these blocked isocyanates decompose to free isocyanate and the blocking species. Deblocking temperatures depend on the blocking groups and typically are in the range 70-200° C. The blocked isocyanate may be included as a component of the sizing composition used to size glass fibres, and may be applied to glass fibres in the manner previously described to form the entity identified as "blocked 2 on glass" in reaction scheme D above. When the glass fibres with blocked isocyanate compound are exposed to unblocking conditions, e.g. elevated temperatures during processing, the isocyanate group may become unblocked to form the active isocyanate compound 2 chemically bonded to the glass surface. Now unblocked, the isocyanate group is available to react with the caprolactam monomer 1 in reaction scheme A above, thereby forming coupling activator compound 3 bonded to the glass surface. The coupling activator compound may then enter into the in situ polymerization reaction on the surface of the glass fibres in accordance with the invention. If the isocyanate is blocked with a monomer in the polymerization reaction; e.g. when the isocyanate is blocked by capolactam in the anionic ring-opening polymerization of caprolactam, the blocked isocyanate may not need to dissociate into the free isocyanate in order to facilitate the ring-opening polymerization reaction.

Sizing compositions suitable for the present invention may be prepared by adding a coupling activator compound of formula I to water or other suitable solvent to form a solution. The sizing composition may also include other sizing composition components known in the art, e.g. film-forming polymers, lubricants, defoamers, biocides, other silanes, etc. The sizing composition should contain an amount of coupling activator compound sufficient to accomplish the desired participation in the ring-opening polymerization. The overall concentration of the coupling activator compound and other components in the sizing composition can be adjusted over a wide range according to the means of application to be used, the character of the inorganic reinforcing material to be sized, and the intended use of the sized inorganic reinforcing material. In one embodiment, the sizing composition may contain about 5 wt % of the coupling activator compound. The components may be added sequentially, or they may be pre-diluted before they are combined to form the sizing composition.

The sizing composition may be applied to the inorganic substrate by suitable methods known to one of skill in the art. For example, the sizing composition may be applied to glass fibres pulled from a bushing using a kiss-roll applicator. Other ways of applying the sizing composition may include contacting glass fibres with other static or dynamic applicators, such as a belt applicator, spraying, dipping, or any other means. Alternatively, the coupling activator compound may be added to the binder used in the process of forming woven or non-woven mats.

After the sizing has been applied, fibres may be collected in rovings or may be chopped to form chopped strands. Rovings of continuous sized strands may be used in some applications, e.g. in long-fibre thermoplastics, or the rovings may be commingled and may be later chopped to a desired length. The length and diameter of the chopped glass fibres used for reinforcing polyamide resins may be determined by various factors such as, but not limited to, the ease of handling when glass fibres are melt-kneaded with a polyamide resin, the reinforcing effect of the glass fibres, glass fibre dispersing ability, the type of polyamide resin in which the chopped glass fibre will be used to reinforce and the intended use of a glass-reinforced polyamide resin article. In some embodiments, the length of the chopped glass fibre strand may have a lower limit of 1 mm and an upper limit of length of 50 mm. In one embodiment suitable for reinforcement of Nylon-6, the length of the strand may be about 6 mm. After the fibre strands have been chopped, they may then be dried until the moisture level of the fibres is sufficiently low, e.g. below 0.1%.

Non-limiting examples of glass fibres suitable for use in the present invention can include those prepared from fibresable glass compositions such as "E-glass", "A-glass", "C-glass", "S-glass", "ECR-glass" (corrosion resistant glass), "T-glass", and fluorine and/or boron-free derivatives thereof. Typical formulations of glass fibres are disclosed in K. Lowenstein, The Manufacturing Technology of Continuous Glass Fibres (Third Ed. 1993), incorporated herein by reference.

The invention further provides reinforced resin materials and processes for preparing them from an inorganic substrate that has bonded thereto coupling activator compounds of the present invention. In one embodiment, a sizing composition comprising the coupling activator compound of Formula I may be applied to a glass substrate, the sized glass substrate may be mixed with a lactam monomer and a polymerization catalyst to form a polymerization mixture; and the mixture may be exposed to conditions sufficient to cause an in situ anionic ring-opening polymerization of the lactam monomer, thereby forming a polymer/glass matrix in which the glass substrate is grafted to the polyamide polymer. The polymerization is referred to as "in situ" because the polymer is formed directly on the surface of the glass substrate, as opposed to being first formed and then coated on the glass surface. As a result, the coupling of the glass component and the polymer component of the composite material is substantially improved over prior art glass-reinforced resins.

Reinforced resin materials of the invention may be produced using well-known processing procedures such as reactive extrusion, resin transfer molding, pultrusion, reaction transfer molding, D-LFT, compression and injection molding, and reaction injection molding. Example 1 below illustrates the production of glass-reinforced polyamide-6 using the process of the invention in a reactive extrusion process, and for comparative purposes, Example 2 below illustrates the production of a glass-reinforced polyamide-6 using a conventional reactive extrusion process:

EXAMPLE 1

Chopped fibre strands sized with a sizing composition comprising 2-oxo-N-(3-(triethoxysilyl)propyl)azepane-1-carboxamide (compound 3 in reaction scheme A above) may be fed into an extruder as previously described. A monomer mix comprising caprolactam monomer 1 and sodium caprolactam catalyst 4, as shown in reaction scheme B above, may also be fed into the extruder to be mixed and heated with the sized glass fibres. The processing conditions within the extruder initiate and complete an anionic ring-opening polymerization of caprolactam 1 in accordance with reaction scheme B, and strands of the resulting glass-reinforced Nylon-6 may be extruded through the extruder die. A sample strand of the glass-reinforced Nylon-6 may be broken under tension. The breaking point may be analyzed with a Scanning Electron Microscope (SEM) to show the outstanding coupling of glass and polymer in the composite material provided by the present invention.

EXAMPLE 2

Chopped glass fibres strands may be sized with a conventional sizing composition comprising 0-30 wt % of γ-aminopropyltriethoxysilane or other suitable silane coupling agent, 20-70 wt % of a polyurethane emulsion or a suitable mixture of emulsions, and 10-50 wt % of a lubricant or mixture of lubricants, and 0-50 wt % of any other required or preferred additives. The chopped sized fibres may be fed into the same extruder used in Example 1 above. Referring to reaction scheme E below, monomer mix comprising caprolactam monomer 1, sodium caprolactam catalyst 4 and a commercially-available activator 5 may also be fed into the extruder, thereby mixing and heating the mix with the sized glass fibres. The processing conditions within the extruder initiate and complete an anionic ring-opening polymerization of the caprolactam monomer 1 within the extruder in accordance with reaction scheme E below:

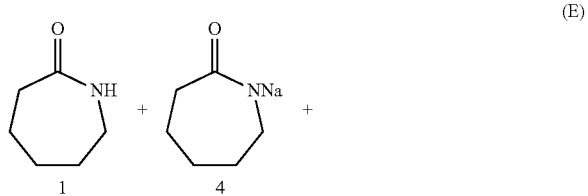

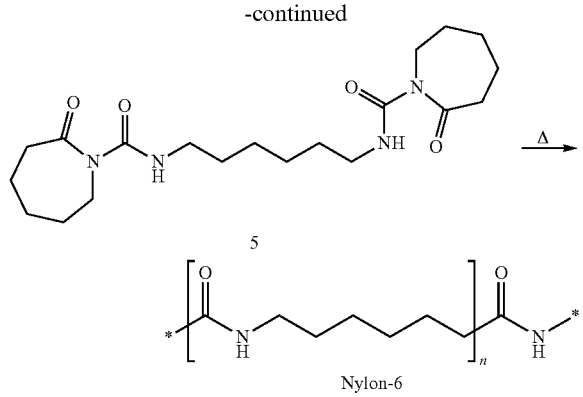

Strands of the resulting Nylon-6 may then be obtained from the extruder die and analysis of the breaking point of a broken strand may be performed to show only average coupling between the glass and the polymer matrix. The comparison between the products of Examples 1 and 2 clearly demonstrate the unexpected and superior results achieved by the present invention.

In another embodiment, substrates of the present invention may be used in a resin transfer molding process. For example, glass or other fibres or fibrous mats or fabrics, may be placed in a closed mold and a mixture comprising lactam monomer and polymerization catalyst may be transferred into the mold to form a polymerization mixture. The mold walls may be heated to a temperature sufficient to cause ring-opening polymerization of the monomer and result in the formation of the glass-reinforced resin material in the mold shape. The mold may then be opened to provide a shaped glass-reinforced resin article. In another embodiment, the present invention may be used to simplify the preparation of woven or nonwoven fabric laminates using vacuum-assisted resin transfer molding. These materials may be used to make high-end composites for applications such as wind turbine blades, automotive or aircraft parts, and reinforced pressure vessels. Current processes typically utilize a two-component application wherein a first molten mixture comprising lactam monomer and polymerization catalyst and a second molten mixture comprising lactam monomer and activator compound are separately mixed with glass fibres containing conventional sizing. In a vacuum-assisted resin transfer molding process utilizing the present invention, only one mixture comprising lactam monomer and polymerization catalyst may be used to cover glass fibres containing a coupling activator compound of Formula I.

In another embodiment, the process of the invention may comprise using the sized substrates in a pultrusion process. For example, glass fibres containing a coupling activator compound of Formula I may be pulled from a creel through a bath comprising a composition of lactam monomer and polymerization catalyst to impregnate the fibres. The impregnated glass fibres may then enter a heated die that has been machined to the final shape of the article to be produced. While the impregnated glass fibres are being pulled through the die, the heat causes polymerization of the lactam monomer and the formation of the glass-reinforced resin, which exits the die in the desired shape. The shaped resin may then be cut to the desired length.

In still another embodiment, the process of the invention may comprise using substrates containing a coupling activator compound of Formula I in a reaction injection molding process. For example, glass fibres sized with a compound of Formula I may be dispersed in a liquid composition comprising lactam monomer and polymerization catalyst. The liquid composition may then be injected into a mold and heated to cause anionic ring-opening polymerization of the lactam monomer. After polymerization is completed, the shaped glass-reinforced resin may be removed from the mold.

One skilled in the art can easily ascertain the essential characteristics of this invention from the foregoing description, and without departing from the spirit and scope thereof, can make various changes and modifications of the invention to adapt it to various usages and conditions.

What is claimed is:

1. A process for preparing a reinforced resin material comprising the steps of:
   providing an inorganic substrate;
   applying to the inorganic substrate a sizing composition comprising a coupling activator compound of the formula:

S—X-A wherein S represents a silane coupling moiety capable of bonding with the surface of the inorganic substrate, and A represents a ring-opening polymerization activator moiety, or blocked precursor thereof; which is capable of participating in an in situ ring-opening polymerization of a monomer in the presence of a polymerization catalyst when exposed to ring-opening polymerization conditions, and X represents a linking moiety capable of linking the S moiety and the A moiety, and wherein the coupling activator compound is a sole initiator in the in situ ring-opening polymerization reaction;
   mixing the sized inorganic substrate with a monomer and a ring-opening polymerization catalyst to form a polymerization mixture, wherein the monomer is a lactam or lactone having 3-12 carbon atoms in the main ring; and
   exposing the polymerization mixture to conditions sufficient to cause the in situ ring-opening polymerization of the monomer to form a reinforced resin in which the inorganic substrate is grafted onto a polymer, wherein the polymerization is anionic ring-opening polymerization.

2. A process according to claim 1 wherein A is a blocked isocyanate group that becomes unblocked to form an active isocyanate group that reacts with the monomer to form the polymerization activator moiety when exposed to the polymerization conditions.

3. A process according to claim 1 wherein the sizing composition is coated on the surface of glass fibres and the sized glass fibres are collected in the form of rovings.

4. A process according to claim 1 comprising a reactive extrusion process wherein sized glass fibres and a composition comprising monomer and catalyst are separately fed into an extruder to form the polymerization mixture, the polymerization mixture is exposed to polymerization conditions in the extruder to cause the polymerization, and the resultant fiber reinforced resin is extruded through a die into the desired shape.

5. A process according to claim 1 comprising a resin transfer molding process wherein sized fibres and a composition comprising monomer and catalyst are mixed together in a closed mold to form the polymerization mixture, the polymerization mixture is exposed to the polymerization conditions in the mold to cause the polymerization, the mold is opened, and the resultant shaped fiber reinforced resin is removed from the mold.

6. A process according to claim 1 comprising a pultrusion process wherein sized fibres are pulled through a composition comprising monomer and catalyst to impregnate the fibres with the composition and form the polymerization mixture, the impregnated fibres are pulled through a heated die to cause the polymerization, and the resultant shaped fiber reinforced resin is recovered from the die.

7. A process according to claim 1 comprising a reinforced reaction injection molding process wherein sized fibres are dispersed in a liquid composition comprising monomer and catalyst, the liquid composition is injected into a mold, heated to cause the polymerization, and the resultant shaped fiber reinforced resin is removed from the mold.

8. A glass-reinforced resin material formed by the process of claim 1.

9. A process for preparing fibreglass-reinforced Nylon-6 comprising the steps of:
    preparing a sizing composition comprising 2-oxo-N-(3-(triethoxysilyl)propyl)azepane-1-carboxamide, wherein 2-oxo-N-(3 -(triethoxysilyl)propyl)azepane-1-carboxamide is a sole initiator in an in situ ring-opening polymerization reaction;
    coating the sizing composition on the surface of rovings of glass fibres;
    drying the sized rovings;
    mixing the sized rovings with a caprolactam monomer and sodium caprolactam catalyst to form a polymerization mixture; and
    heating the polymerization composition to a temperature sufficient to cause the in situ anionic ring-opening polymerization of the caprolactam monomer to form a matrix in which the glass fibres are grafted to Nylon-6 polymer.

10. A glass-reinforced Nylon-6 formed by the process of claim 9.

* * * * *